(12) United States Patent
Guth et al.

(10) Patent No.: US 6,336,638 B1
(45) Date of Patent: Jan. 8, 2002

(54) RADIAL SHAFT SEAL

(75) Inventors: Wolfgang Guth, Laudenbach; Werner Hufnagel, Grossbettlingen, both of (DE)

(73) Assignee: Firma Carl Freudenberg, Weinheim (DE)

(*) Notice: Subject to any disclaimer, the term of this patent is extended or adjusted under 35 U.S.C. 154(b) by 0 days.

(21) Appl. No.: 09/373,344

(22) Filed: Aug. 12, 1999

(30) Foreign Application Priority Data

Aug. 14, 1998 (DE) ......................... 198 36 986

(51) Int. Cl.⁷ .................. F16J 15/16; F16J 15/32
(52) U.S. Cl. .............. 277/500; 277/549; 277/559; 277/560; 277/570
(58) Field of Search .................. 277/559, 549, 277/560, 561, 570, 500

(56) References Cited

U.S. PATENT DOCUMENTS

| | | | |
|---|---|---|---|
| 4,709,930 A | * 12/1987 | Forch | 277/68 |
| 4,886,281 A | * 12/1989 | Ehrmann et al. | 277/47 |
| 5,209,502 A | * 5/1993 | Savoia | 277/152 |
| 5,615,894 A | * 4/1997 | vom Schemm | 277/134 |

FOREIGN PATENT DOCUMENTS

DE 195 39 057 4/1997

* cited by examiner

*Primary Examiner*—Anthony Knight
*Assistant Examiner*—Matthew E. Rodgers
(74) *Attorney, Agent, or Firm*—Kenyon & Kenyon

(57) ABSTRACT

A radial shaft seal with a sealing disk made of a polymer material which curves towards a space that is sealed as the sealing disk radially approaches a shaft with respect to which it forms a seal. The sealing disk has a first surface profiling on the side facing the shaft and a second surface profiling on the side facing away from the shaft, the first surface profiling being formed by sawtooth recesses arranged adjacent to one another axially at a distance. The first bordering surfaces of the recesses facing the space to be sealed form a smaller angle with the shaft than second bordering surfaces of the recesses facing away from the space to be sealed. The second surface profiling is formed by essentially U-shaped recesses which are open on the side facing away from the shaft and are arranged adjacent to one another with an axial distance between them.

7 Claims, 2 Drawing Sheets

REGION X

RADIAL SHAFT SEAL

BACKGROUND OF THE INVENTION

The present invention relates to a radial shaft seal having a radial shaft seal with a sealing disk made of a polymer material which bulges forward radially on the inside axially in the direction of a space to be sealed and which peripherally encloses peripherally and seals against a shaft. The sealing disk has a first surface profiling on the side facing the shaft and a second surface profiling on the side facing away from the shaft. The first surface profiling is formed by sawtooth recesses arranged adjacent to one another axially at a distance, and the first bordering surfaces of the recesses facing the space to be sealed form a smaller angle with the shaft than the second bordering surfaces of the recesses facing away from the space to be sealed.

Such a radial shaft seal is described in German Patent 195 39 057 A1. Here, the radial shaft seal has a bearing ring and a ring-shaped sealing disk made of an elastically deformable material that extends essentially in the radial direction, with the bearing ring and the sealing disk being joined together. The sealing disk can bulge forward on the inside radially in the direction of a space to be sealed. It is provided with a first surface profiling which can be placed against the shaft, sealing it under a radial prestress, thereby sealing it on the side facing away from the space to be sealed in the axial direction, so that leakage fluid can be conveyed back into the space to be sealed as the shaft to be sealed rotates in a first direction of rotation. The sealing disk is provided with a second surface profiling on the side facing away from the first surface profiling so that leakage fluid can be conveyed back into the space to be sealed as the shaft rotates in a second direction of rotation opposite the first direction of rotation. The sealing disk can bulge forward in the axial direction on both sides on the inside radially and the second surface profiling can also be placed against the shaft, sealing it under a radial prestress. In this known approach, the radial shaft seal is structured so that two identical radial shaft seals are capable of sealing the opposite ends of a shaft in the axial direction, so that each of the radial shaft seals has the effect of conveying the medium to be sealed in the direction of the space to be sealed. From an economic standpoint, this design of a radial shaft seal is especially advantageous because both directions of rotation of the shaft can be sealed by identical radial shaft seals. The sealing disk is provided with matching first and second profiling.

SUMMARY OF THE INVENTION

An object of the present invention is to further develop a radial shaft seal of the type described above so as be better assure for the proper recirculation of the medium to be sealed in the direction of the space to be sealed, while also providing that the sealing disk be especially flexible in the radial direction to compensate for radial runout of the shaft to be sealed. A further object is to improve the dissipation of the heat of friction from the sealing disk.

To achieve this object, it is proposed that the second surface profiling be formed by essentially U-shaped recesses which are open on the side facing away from the shaft and are provided axially adjacent and spaced with respect to one another. The sawtooth profile of the first surface profiling has the advantage that the medium to be sealed is effectively conveyed back in the direction of the space to be sealed during the intended use of the radial shaft seal. Due to the much larger volume of the sawtooth recesses in comparison with cut indentations, they are especially suitable for collecting impurities from the medium to be sealed, e.g., to collect oil carbon. Impurities are removed from the oil cycle by being collected in these recesses, thereby minimizing the risk of damage to the sealing area of the sealing disk.

The sawtooth recesses on the side of the sealing disk facing the shaft and the U-shaped recesses on the side of the sealing disk facing away from the shaft have the effect that the sealing disk is very flexible in the radial direction and is capable of following the movements of the shaft to be sealed even when there is radial runout. In addition, the U-shaped recesses in combination with the sawtooth recesses result in a very large surface area suitable for rapidly dissipating the resulting heat of friction from the sealing disk.

The sealing disk is preferably made of PTFE. Therefore, the sealing disk is resistant to most media to be sealed. In addition, PTFE has a good thermal stability as well as good lubricant properties. A sealing disk made of PTFE is almost free of wear, because the surface becomes glassy after a certain initial wear and is therefore much more resistant.

For example, copolymers suitable for injection molding such as FEP (perfluoroethylenepropylene) or PFA (perfluoroalkoxy copolymer) or a thermoplastic copolymer may be used. However, the sealing disk may also be made of other materials.

The sealing disk preferably has a thickness of 0.5 to 1 mm. The use properties are especially advantageous if the thickness is 0.6 to 0.75 mm, depending on the diameter of the shaft to be sealed. If the thickness of the sealing disk is less than 0.5 mm, it has the disadvantage that the depth of the recesses must be reduced and thus the sealing disk has only a very low rigidity.

However, if the thickness of the sealing disk is more than 1 mm, it has the disadvantage that the sealing disk surrounds the shaft and is in contact with it under too much prestress, thus resulting in substantial power loss.

The sawtooth recesses and/or U-shaped recesses are preferably embossed in the sealing disk without removing any material. Since the recesses are manufactured without using machining methods, it is advantageous that the sealing disk can also withstand a very large number of stress cycles without being damaged even when there is radial runout of the shaft to be sealed, because the notching effects in the area of the recesses are greatly reduced in comparison with recesses produced via machining methods.

The sawtooth and U-shaped recesses are preferably arranged with one opposite the gap of the other. Due to such a design, approximately the same material thickness is achieved along the axial extent of the sealing disks. Such a design prevents an unwanted accumulation of material, which would be a disadvantage from the standpoint of manufacturing technology and also with regard to good wear properties. On the other hand, the articulation points are between the sawtooth recesses, so that the geometric dimensions of the sawtooth recesses are largely maintained even if the sealing disk is used for sealing shafts that run out of true.

The ratio of the radial depth of the U-shaped recesses to the radial depth of the sawtooth recesses may be 1 to 4.5, preferably 3. Such a ratio yields an excellent compromise between good flexibility of the sealing disk in the radial direction to compensate for radial runout of the shaft, good sealing of the medium to be sealed over a long period of use and a large surface area for cooling the sealing disk and for dissipating the heat of friction.

BRIEF DESCRIPTION OF THE DRAWINGS

The drawings schematically illustrate one embodiment of a radial shaft seal constructed according to the principles of the invention, in which.

DETAILED DESCRIPTION

Figure 1:
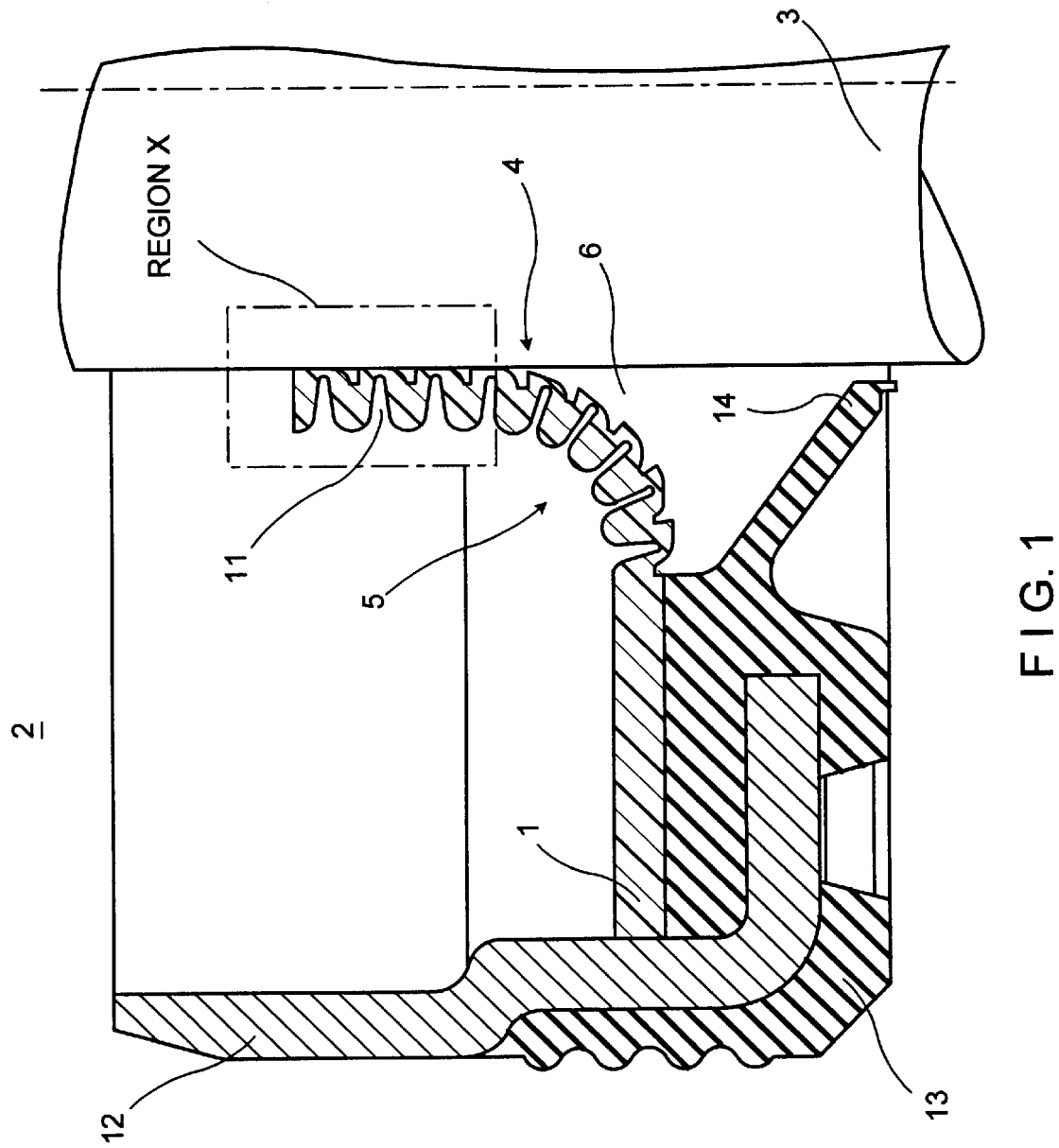
FIG. 1 is a partial sectional view of an embodiment of a radial shaft seal according to the present invention surrounding and sealing a shaft.

FIG. 1 shows an embodiment of a radial shaft seal constructed according to the present invention, including a supporting body 12 of a hard tough material, with supporting body 12 in this embodiment being made of a metallic material. Static gasket 13 and dynamically stressed ballast gasket 14 are joined to supporting body 12 by vulcanization. In this embodiment, static gasket 13 is designed in one piece and made of the same material as ballast gasket 14 with a smooth transition between the two. Ballast gasket 14 surrounds shaft 3 to be sealed under an elastic radial prestress.

On the side facing the space 2 to be sealed, the elastomer material is attached to sealing disk 1 made of PTFE, with sealing disk 1 bulging forward radially on the inside axially in the direction of sealed-off space 2. Sealing disk 1 is provided with a surface profiling 4, 5 on the side facing the shaft and on the side facing away from shaft 3. The first surface profiling 4 which faces shaft 3 has sawtooth recesses 6. These sawtooth recesses 6 extend from the axially bulging area of sealing disk 1 to the area where it is attached to the elastomer material. Between each sawtooth recess 6, an essentially U-shaped recess 11 which is open to the outside radially is provided on the side facing away from the shaft, forming a second surface profiling 5. These two surface profilings 4, 5 are each designed in the manner of a thread.

Figure 2:
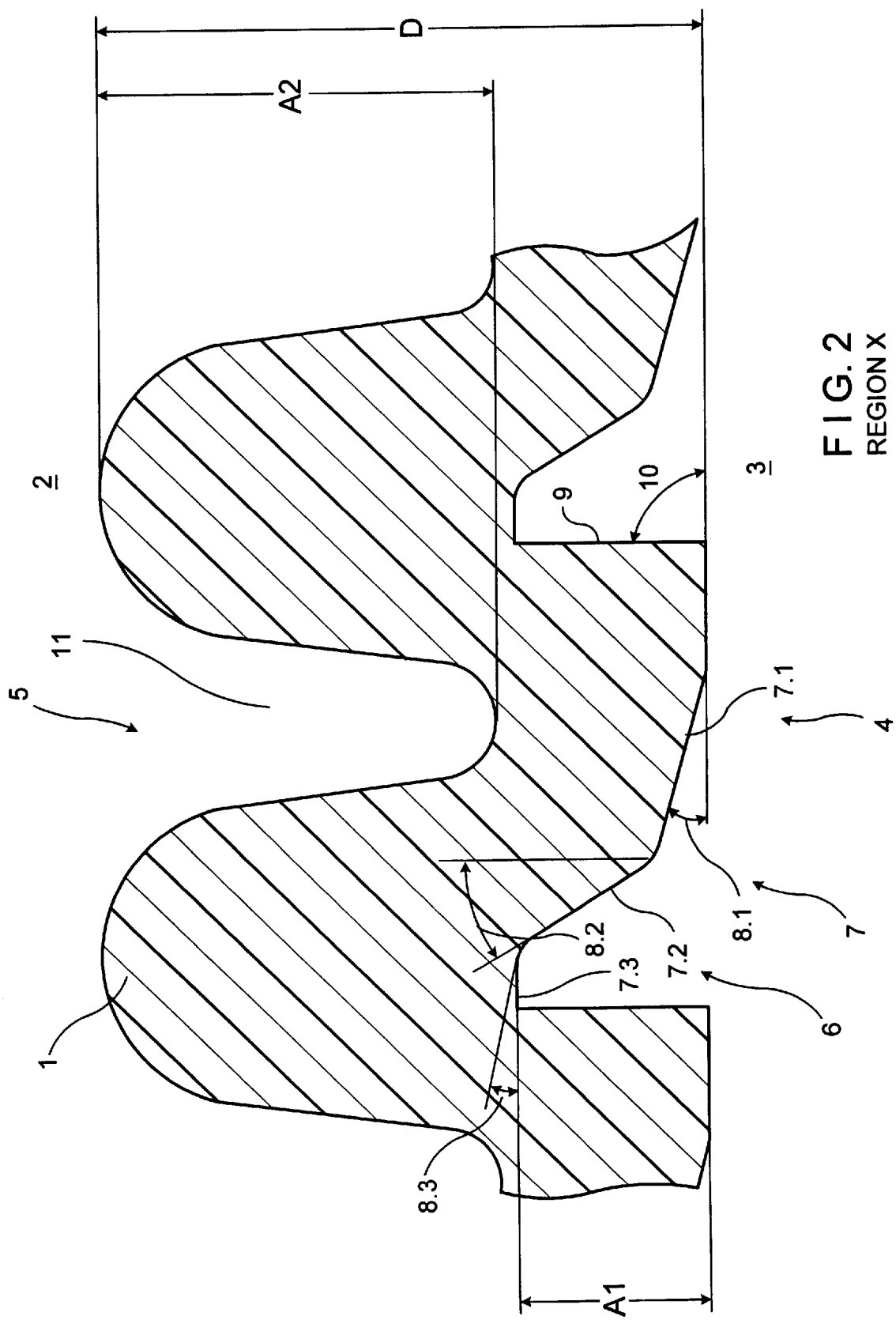
FIG. 2 is an enlarged view of a detail x from FIG. 1.

FIG. 2 shows a detailed picture of region x from FIG. 1 on an enlarged scale. Sawtooth recesses 6 of the first surface profiling 4 are arranged adjacent to one another with an axial distance between them. In this embodiment, bordering surface 7, facing space 2, is divided into three partial areas 7.1, 7.2, and 7.3, which form differing angles 8.1, 8.2, and 8.3, with shaft 3. In this embodiment, angle 8.1 is 15°, angle 8.2 is 32°, and angle 8.3 is 0°. In each case, each angle, 8.1, 8.2, and 8.3, is smaller than right angle 10 formed by second bordering surface 9 facing away from space 2 and shaft 3.

Depending on the diameter of shaft 3 to be sealed, thickness D of sealing disk 1 is preferably between 0.6 and 0.75 mm. Sawtooth recesses 6 and U-shaped recesses 11 are arranged with one opposite the gap of the other, with the ratio of radial depth A2 of U-shaped recesses 11 to radial depth A1 of sawtooth recesses 6 being 3:1 in this embodiment.

What is claimed is:

1. A radial shaft seal, comprising:

a polymeric sealing disk which curves in the direction of a space to be sealed as the sealing disk approaches a shaft against which the disk seals, the disk further comprising a first surface profiling on a side facing the shaft, and a second surface profiling on a side facing away from the shaft, wherein:

the first surface profiling is formed by sawtooth recesses that are axially spaced apart, the first surface profiling having at least one first bordering surface that faces the space and at least one second bordering surface that faces away from the space, wherein the second bordering surface forms an angle with the shaft; and the first bordering surface is divided into at least three partial areas, each partial area forming an angle with the shaft that is less than the angle formed between the second bordering surface and the shaft; and the second surface profiling is formed by essentially U-shaped recesses which are open on the side facing away from the shaft and are arranged adjacent to one another with an axial distance between them.

2. The radial shaft seal according to claim 1, wherein the sealing disk is made of PTFE.

3. The radial shaft seal according to claim 1, wherein the sealing disk is made of injectable copolymers.

4. The radial shaft seal according to claim 1, wherein the sealing disk has a thickness of 0.5 to 1 mm.

5. The radial shaft seal according to claim 1, wherein the sawtooth recesses and/or the U-shaped recesses are embossed in the sealing disk without removing any material.

6. The radial shaft seal according to claim 1, wherein the sawtooth recesses and U-shaped recesses are arranged with one opposite the gap of the other.

7. The radial shaft seal according to claim 1, wherein the ratio of the radial depth of the U-shaped recesses to the radial depth of the sawtooth recesses amounts to slightly greater than 1 to 4.5.

* * * * *